United States Patent [19]

Rittstieg et al.

[11] Patent Number: 5,669,597
[45] Date of Patent: Sep. 23, 1997

[54] SELF-PUMPING AIR SUSPENSION SPRING MOUNTED ON A SHOCK ABSORBER ASSEMBLY

[75] Inventors: Henning Rittstieg, Villa Hills, Ky.; Hartmut Rölleke, Obereisser, Germany

[73] Assignee: Fichtel & Sachs AG, Schweinfurt, Germany

[21] Appl. No.: 599,882

[22] Filed: Feb. 14, 1996

[30] Foreign Application Priority Data

Feb. 15, 1995 [DE] Germany .................. 195 05 026.6

[51] Int. Cl.⁶ .................................................. F16F 9/04
[52] U.S. Cl. ................................. 267/64.17; 267/64.21
[58] Field of Search ........................ 267/64.17, 64.21, 267/64.24

[56] References Cited

U.S. PATENT DOCUMENTS

| | | |
|---|---|---|
| Re. 27,883 | 1/1974 | Vogel et al. . |
| 2,946,582 | 7/1960 | Martin .................. 267/64.17 |
| 3,033,556 | 5/1962 | Wössner . |
| 3,391,922 | 7/1968 | Axthammer ............ 267/64.17 |
| 3,790,147 | 2/1974 | Owen . |
| 4,200,269 | 4/1980 | Ludwig ................... 267/364 |
| 4,577,840 | 3/1986 | Meller et al. . |

FOREIGN PATENT DOCUMENTS

| | | |
|---|---|---|
| 2573701 | 5/1986 | France . |
| 3403649 | 8/1984 | Germany . |
| 3826301 | 2/1989 | Germany . |
| 4105771 | 8/1992 | Germany . |
| 4401770 | 8/1995 | Germany . |

Primary Examiner—Robert J. Oberleitner
Assistant Examiner—C. T. Bartz
Attorney, Agent, or Firm—Nils H. Ljungman and Associates

[57] ABSTRACT

Self-pumping air suspension spring for a motor vehicle, comprising a roller bellows, which form a spring chamber, a spring carrier which consists of a cylinder and a piston rod (which piston rod can move axially in the cylinder, whereby the roller bellows are functionally connected to the cylinder and the piston rod), a vestibule with at least one connection to the spring chamber and at least one connection to the air reservoir, which can be of any appropriate type. In the event of a movement of the piston rod, there is a pumping action via the vestibule in connection with at least one non-return valve in the spring chamber, whereby the vestibule is located inside the spring chamber enclosed by the roller bellows and the cylinder. At least one of the components of the air suspension spring executing the pumping action is formed by the piston rod. It is appropriate if the cylinder is used in conjunction with a vibration damper which is part of an air suspension spring.

20 Claims, 5 Drawing Sheets

SELF-PUMPING AIR SUSPENSION SPRING MOUNTED ON A SHOCK ABSORBER ASSEMBLY

BACKGROUND OF THE INVENTION

1. Field of the Invention

The present invention generally relates to a self-pumping air suspension spring for a motor vehicle, comprising roller bellows which form a spring chamber, a spring carrier which includes a cylinder and a piston rod (which piston rod can be displaced axially in the cylinder, whereby the roller bellows are functionally connected to the cylinder and the piston rod), a vestibule, or pilot chamber, with at least one connection to the spring chamber, and at least one connection to the compressed air reservoir. When there is a movement of the piston rod, a pumping process into the spring chamber takes place, via the vestibule, in connection with at least one non-return-valve.

2. Background Information

German Laid Open Patent Application No. 38 26 301 A1 describes a self-pumping air suspension spring in which a spring chamber, formed by a roller bellows, is connected to a vestibule which is filled, by means of a non-return valve, as a function of the movement of the piston rod inside the air suspension spring. The vestibule is located underneath an elastic bearing arrangement on the body, and is enclosed by additional elastic bellows. During the movement of the piston rod, a rubber element of the elastic bearing arrangement can flex in the axial direction, so that the vestibule can expand and then contract. For the function of the air suspension spring, an extremely soft mounting of the piston rod can be essential. Consequently, there can be great elasticities between the vehicle superstructure and a vehicle axle or a vehicle wheel, if the air suspension spring is realized in the form of a telescoping strut.

OBJECT OF THE INVENTION

An object of the present invention is to create a self-pumping air suspension spring, the vestibule of which is realized so that it can essentially be independent of the bearing point.

SUMMARY OF THE INVENTION

In accordance with at least one preferred embodiment of the present invention teaches that an object of the present invention, the object described immediately above can essentially be accomplished by locating the vestibule inside the spring chamber, which spring chamber is enclosed by the roller bellows and the cylinder. At least one of the components of the air suspension spring which performs the pumping process can be formed by the piston rod. The individual parts which belong to the mounting of the air suspension spring preferably do not participate in the pumping process, so that the bearing arrangement can preferably be optimized in terms of its inherent function, essentially without having to take special elasticities into consideration.

In an advantageous embodiment, the vestibule is preferably formed by a tube having a first bottom being functionally connected to the piston rod, and also has a second bottom being functionally connected to the cylinder. Inside the at least partly hollow piston rod, there can be a flow connection with the air reservoir, which flow connection can emerge in the vestibule, whereby the vestibule can be reduced in size when there is an insertion movement of the piston rod, and the excess compressed air can escape into the spring chamber by means of a non-return valve. One bottom, thereby, can essentially act as a piston, and the tube and the other bottom can act as a compression chamber.

At least one embodiment of the present invention teaches that the second bottom can be advantageously formed by an end surface of the cylinder on the piston rod exit side. As additional measures for a simple construction of the air suspension spring, there can be an elastically expandable ring which preferably covers an overflow opening in the tube and acts as the non-return valve between the vestibule and the spring chamber.

Alternatively, the vestibule can be located inside a hollow piston rod, whereby inside the hollow piston rod there can be a piston which is connected to the cylinder, which piston executes a movement relative to the piston rod when there is a spring movement, and thus defines the volume of the vestibule. This variant realization of the present invention is particularly compact, especially if the vestibule is formed by an extension of the flow connection to the air reservoir, which air reservoir can be of any appropriate type.

In an additional advantageous embodiment of the present invention, the pumping process can be performed by a partly-elastic membrane which can surround the piston rod and can be functionally connected to the cylinder. The membrane can be preferably clamped, or held fast, on one of the limiting edges of the membrane and can be in contact by means of the other limiting edge with the component with which the seal is to be created, and together with a wall can form the vestibule which functionally corresponds to the part which firmly clamps the limiting edge in place. As a result of the movement of the part with which the limiting edge of the membrane is in contact and the clamping of the other limiting edge, the vestibule can be made larger or smaller by a shielding movement of the membrane, so that an overpressure or an underpressure can be alternately established in the vestibule. The number of individual parts required for the pumping process can be advantageously very small. Moreover, such a membrane essentially is not a very critical component, and can therefore be very lightweight.

It may be found to be particularly advantageous if the membrane is enclosed above and below by a wall, so that two vestibules are formed. Independently of the direction of movement, a pumping process can essentially always take place by means of one of the vestibules, so that there is no idle stroke. Consequently, the axial length of the vestibule can be smaller than in known similar devices.

For a correct shielding of the membrane, the plane of the wall can be diagonal to the idle position of the membrane. An undefined flexing of the membrane is thus essentially impossible. The wall can also have a shoulder, or offset, of which the clearance, starting from a clamped position of the membrane, is smaller than the width of the membrane itself, so that there can be a clearance zone for the moving limiting edge. This measure can also counteract a bending of the membrane.

To prevent undesirable leakage of the membrane, in particular when the membrane is in its limit position, there can be a curved end surface on the moving limiting edge of the membrane, which end surface rolls along the moving component during the shielding movement of the membrane. The curved end surface preferably has a radius which equals the width of the membrane between the clamped edge and the moving limiting edge in the vicinity of the no-load position.

As described herein, in accordance with at least one embodiment of the present invention, the vestibules can be realized inside a roller tube, which roller tube can be pushed onto the cylinder. No special measures essentially need to be taken on the cylinder. The roller tube can be made of plastic, for example, so that the membrane can be very easily connected to the roller tube during manufacture.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a pneumatic spring and a shock absorber assembly, the assembly comprising: a shock absorber, the shock absorber comprising: a sealed cylinder defining a chamber therein, the cylinder containing a damping medium; the cylinder having a first end portion and a second end portion and a length disposed substantially parallel to the longitudinal axis; a piston rod sealingly projecting into the first end portion of the cylinder and being axially displaceable with respect to the cylinder, the piston rod having a central longitudinal axis, the longitudinal axis defining an axial direction; a piston being attached to the piston rod, the piston being slidably disposed within the cylinder to sealingly divide the chamber into first and second chambers; means for permitting flow of damping medium between the first chamber and the second chamber; a pneumatic spring for applying a substantially axially directed force to the shock absorber; the pneumatic spring comprising: a roll-off tube surrounding at least a portion of the cylinder, the roll-off tube having a length disposed substantially parallel to the longitudinal axis; the length of the roll-off tube being substantially less than the length of the cylinder; means for applying a substantially axially directed force to the shock absorber; the means for applying a substantially axially directed force comprising: bellows means for expanding and contracting; the bellows means being disposed to roll-up on and roll off the roll-off tube; the shock absorber and the pneumatic spring further comprising: an air reservoir; and means for pumping air into the air reservoir; the means for pumping air into the air reservoir comprising mechanical means for compressing air; the mechanical means for compressing air comprising a portion of the piston rod; and the portion of the piston rod comprising. means for mechanically compressing air by movement of the portion of the piston rod.

BRIEF DESCRIPTION OF THE DRAWINGS

The present invention is explained in greater detail below with reference to the embodiments illustrated in the accompanying figures, in which.

DESCRIPTION OF THE PREFERRED EMBODIMENT

Figure 1:
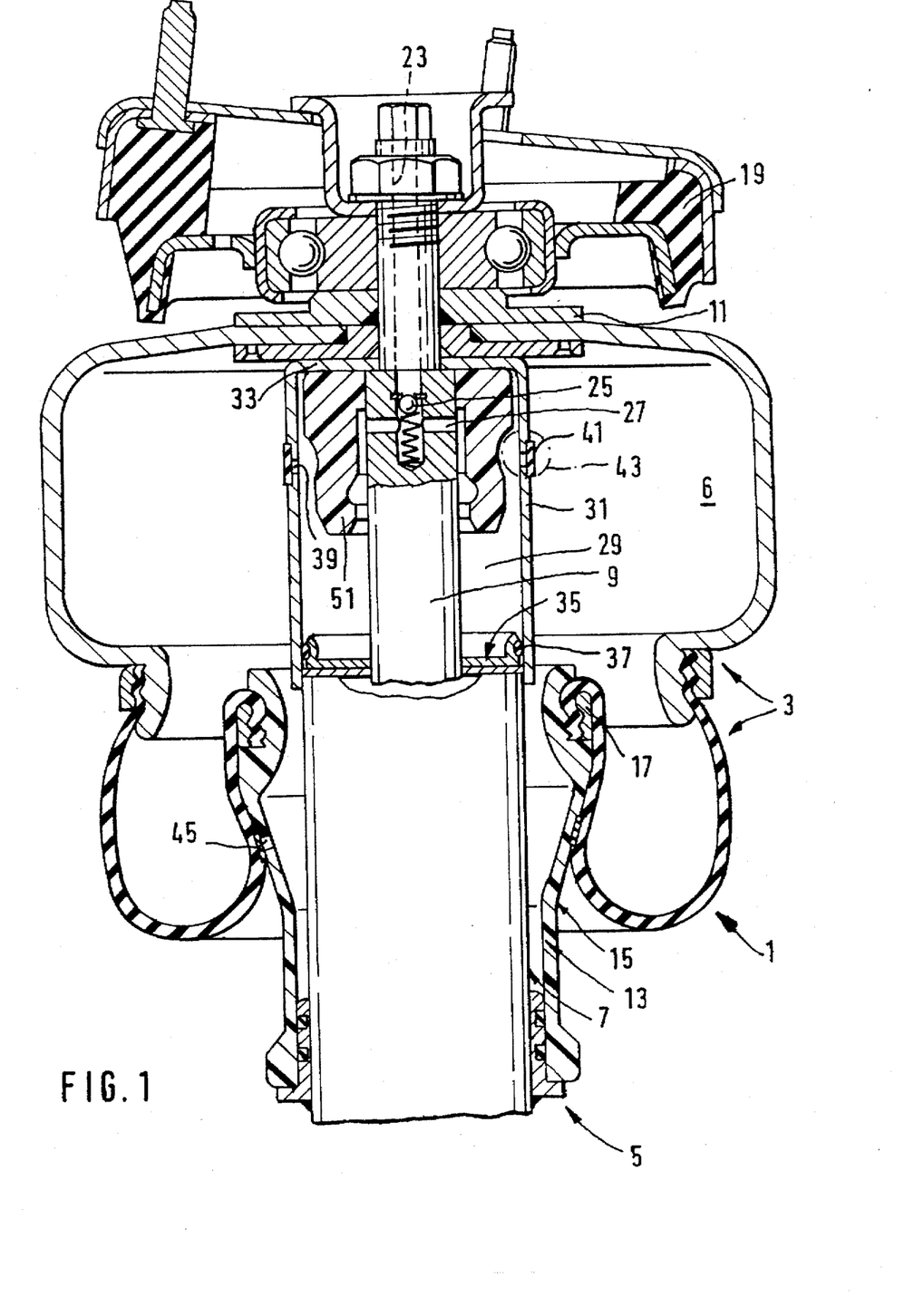
FIGS. 1 and 2 show a self-pumping air suspension spring with a flow connection in the piston rod.

FIG. 1 shows an air suspension spring 1 as it can be used, for example, in a motor vehicle, on a vehicle axle, or a cab.

The essential individual parts are roller bellows 3 and a spring carrier 5. The roller bellows 3 form a spring chamber 6. The roller bellows 3 are functionally connected to a cylinder 7 of the spring carrier 5 and an at least partly hollow piston rod 9. In this embodiment, the roller bellows 3 are preferably clamped between fastening plates 11 which can be mounted on the piston rod 9. The connection to the cylinder 7 can be made by means of a tread, or track, 13 so that the spring rate can be influenced, as a function of the deflection position, by means of a roller contour 15. A band tensioning element 17 can hold the roller bellows 3 on the roller tube 13. The entire air suspension spring 1 can be fastened to a vehicle by means of a bearing element 19 which can also be functionally connected to the piston rod 9. There can be a further connection to the spring carrier 5, which further connection is not shown for reasons of simplicity, e.g. on the cylinder 7. It is appropriate if the cylinder 7 is a component of a vibration damper, or shock absorber.

The self-pumping air suspension spring 1 can be supplied with air from the atmosphere by means of a flow connection 23. The flow connection 23 may consist in practical terms of a blind hole inside the piston rod 9. On the inner end of the flow connection 23 there is preferably a non-return valve 25 which can open in the inflow direction. Adjacent to the non-return valve 25 can be radial openings 27, which lead from the flow connection 23 to a vestibule 29.

The vestibule 29 is preferably formed by a tube 31. The end of the tube 31 has a first bottom 33, which functionally corresponds to the piston rod 9. A second bottom 35 is formed by the end surface of the cylinder 7 on the piston rod 9 outlet side. The second bottom 35 closes the tube 31, whereby the vestibule 29 is closed by means of a seal 37 with respect to the spring chamber 6. In this embodiment of the present invention, the first bottom 33 is realized in one single piece with the tube 31, so that when the piston rod 9 moves, the tube 31 with the first bottom 33 can be moved toward the second bottom 35, whereby the volume of the vestibule 29 can be reduced. At least one overflow opening 39 which can be sealed by an encircling elastic ring 41 on the tube 31 forms an additional non-return valve 43, which non-return valve 43 also opens in the inflow direction toward the spring chamber 6.

When there is a movement of the piston rod 9 in the excursion direction, the volume of the vestibule 29 can be increased on account of the increased distance between the first bottom 33 and the second bottom 35. A result can be the establishment of an underpressure, with respect to the atmosphere, which underpressure can result in an opening movement of the non-return valve 25 in the flow connection 23. The air from the atmosphere thereby can flow into the vestibule 29. On the occasion of the subsequent insertion movement, the distance between the first bottom 33 and the second bottom 35 can be reduced, resulting in a compression of the air in the vestibule 29. An overpressure can be established which can open the non-return valve 43 in the tube 31, so that the pressure level in the spring chamber 6 can increase. The spring rate of the air suspension spring 1 can increase correspondingly, whereupon the piston rod 9 can execute an excursion movement, until a new level position is reached which corresponds to the load. The roller bellows 3 thereby can execute a rolling motion along the roller tube 31, which can cause the roller bellows 3 to open or close a discharge opening 45. If, for any reason, the load on the air suspension spring 1 is reduced, the piston rod 9 can continue its excursion movement for a short period. In that case, the roller bellows 3 can lift up from the discharge opening 45, and compressed air can escape from the spring chamber 6, until a new level position is assumed, and the roller bellows 3 once again close the discharge opening 45.

Figure 2:
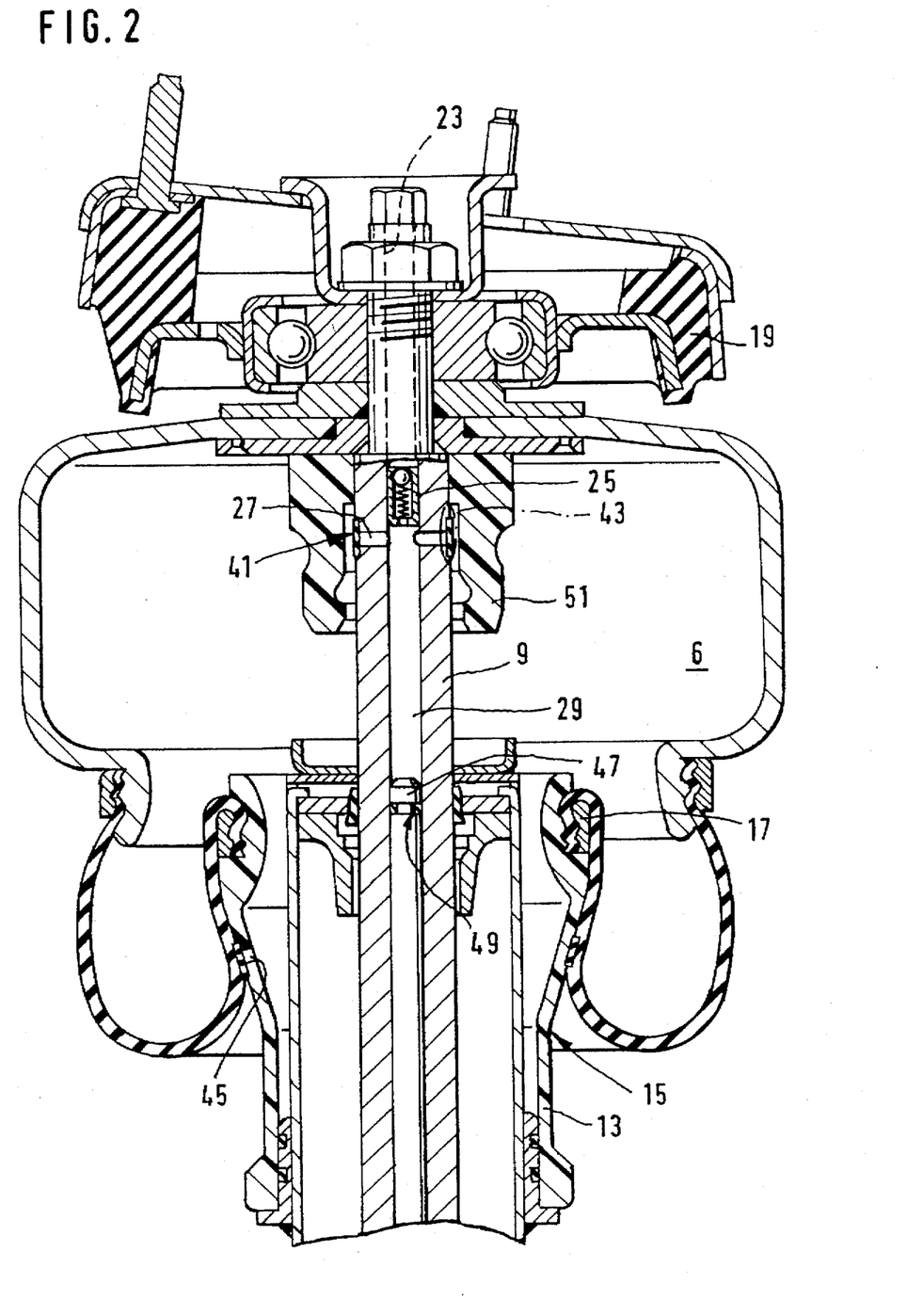

FIG. 2 illustrates the vestibule 29 as being essentially formed, in practical terms, by the flow connection 23 inside the piston rod 9, which piston rod 9 can be hollow over its entire length. Fastened to the bottom of the cylinder (not shown) can be a piston 47 which essentially always executes a movement relative to the piston rod 9, and can slide inside the flow connection 23 or the vestibule 29. The piston 47 can be sealed by means of a seal 49 against the wall of the flow connection 23. There is preferably a non-return valve 25 which can open in the inlet direction. In contrast to FIG. 1, as the non-return valve 43, the elastic ring 41 can sit directly on the outlet of the radial openings 27 of the piston rod 9. As a result of the relative movement between the piston 47 and the piston rod 9, a decompression and compression movement essentially can always take place, whereupon the spring rate of the air volume enclosed inside the spring chamber 6 can adjust the level of the air suspension spring as a function of the load. The stop buffer 51 in FIGS. 1 and 2 can be considered an optional component.

Figure 3:
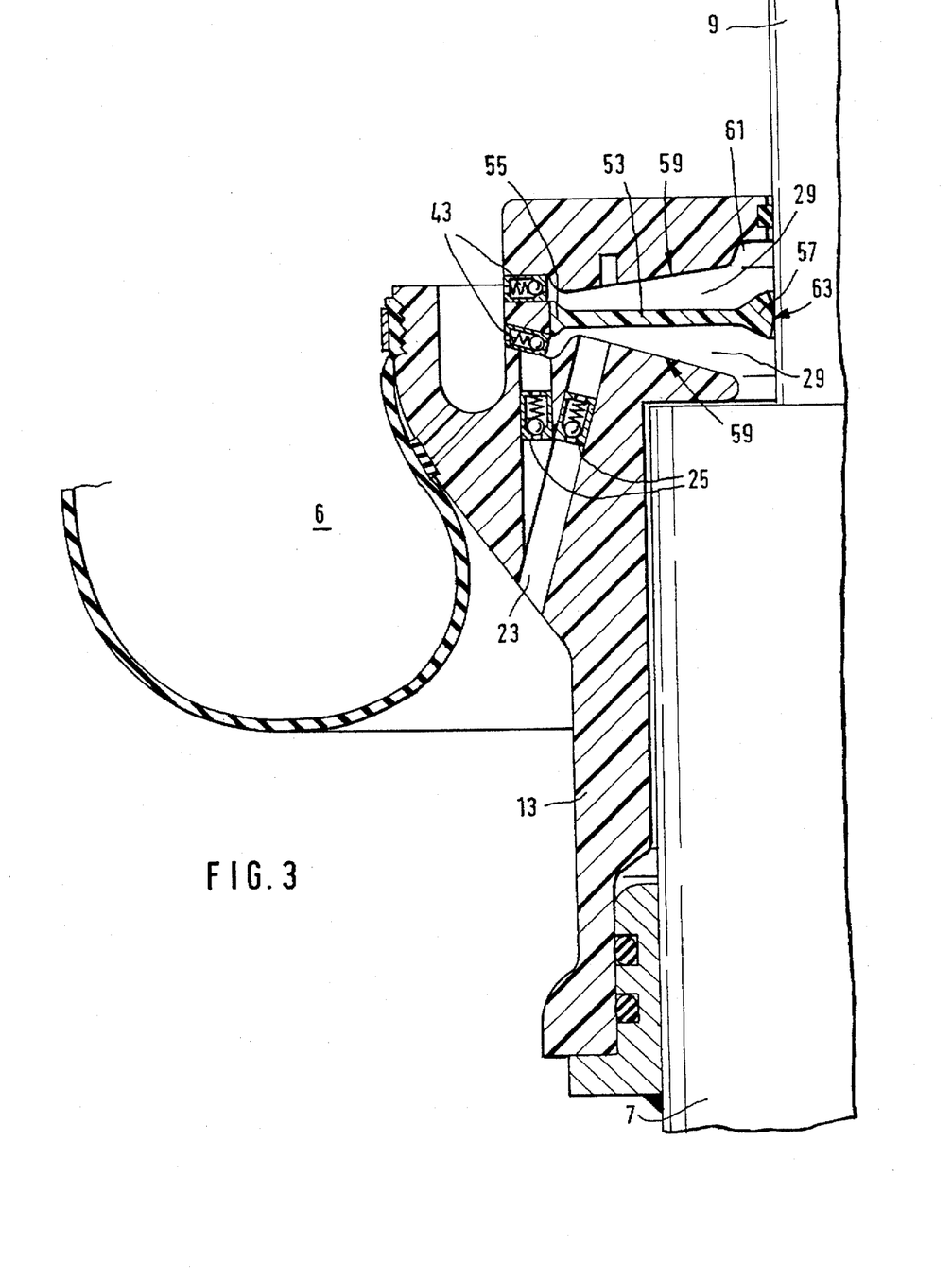
FIG. 3 shows an air suspension spring with a membrane as the pump element.

In a variant embodiment of the present invention, illustrated in FIG. 3, the pump mechanism can be a membrane 53 which is firmly clamped on its outer limiting edge 55 to the roller tube 13 which functionally corresponds to the cylinder 7. The inner limiting edge 57 of membrane 53 can be in contact with the piston rod 9, whereby the membrane 53 preferably surrounds the piston rod 9. In the event of a movement of the piston rod 9, the membrane 53 can be synchronously driven, until the membrane 53 reaches a wall 59 of the roller tube 13. The wall 59, together with the membrane 53 can form the vestibule 29, whereby the membrane 53 can be shielded. The vestibule 29 can be once again connected by means of a flow connection 23 with the atmosphere or the spring chamber 6 by means of at least one of the non-return valves 25/43 which can open in the inlet and output direction. The plane of the wall 59 of the roller tube 13 is preferably oriented at an angle with respect to the no-load position of the membrane 53, so that the membrane 53 can be guided in a defined manner in the limit position of the membrane 53. In this context, the wall 59 is preferably shorter than the width of the membrane 53, so that there can be a clearance zone for the inner limiting edge 57 of the membrane 53. The inner limiting edge 57 can be somewhat thicker, so that an end surface 63 of the membrane 53 can be realized with a curve. When the membrane 53 is preferably driven by the piston rod 9, the end surface 63 can roll along the piston rod 9, whereby essentially no friction would be generated, although a sealing action could nevertheless be performed. To increase efficiency, there can be a wall 59 located both above and below the membrane 53, so that two vestibules 29 can be formed, which two vestibules 29 could exert their compression function in opposite directions, whereby the two vestibules 29 can each have their own non-return valves 25, 43.

When there is an insertion movement of the piston rod 9, the volume of the lower of the vestibules 29 can be reduced, so that the corresponding non-return valve 43 can open around spring chamber 6. Simultaneously, the volume of the upper vestibule 29 can increase, because the non-return valve could open for the inlet. During the excursion movement, the volume of the upper vestibule 29 can decrease, and the volume of the lower vestibule 29 increase accordingly. The valves could open and close on account of the pressure conditions in the vestibule 29.

As a result of this arrangement of the vestibules there could essentially be no idle strokes, so that even in the event of relatively small individual vestibules, a strong pumping action can be achieved. Preferably, the discharge function of the air suspension spring is essentially identical to the realizations illustrated in FIGS. 1 and 2. Of course, the membrane 53 can also be fastened to the piston rod 9, but this arrangement can have advantages in terms of construction and manufacture. Essentially all self-pumping air suspension springs can also be combined with an external or internal adjustable damping valve, as described in greater detail in German Patent No. 41 05 771.

The disclosure now turns to an example of a vibration damper, or shock absorber, in which the present invention, in accordance with at least one preferred embodiment, may be employed. It should be understood that components discussed herebelow with reference to FIGS. 4 and 5 may, if appropriate, be considered to be interchangeable with similar components discussed hereabove with respect to FIGS. 1–3.

Figure 4:
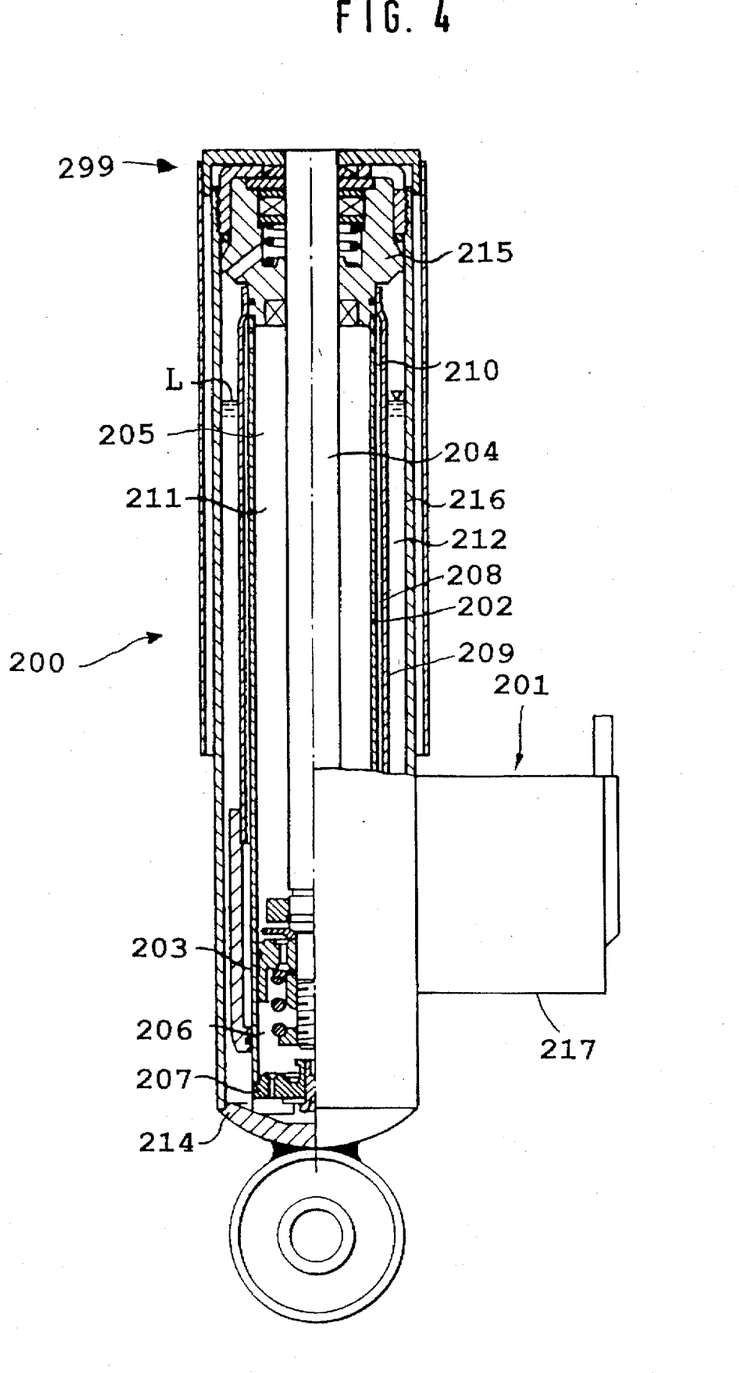
FIG. 4 shows a shock absorber with which the embodiments of the present invention could be incorporated.

FIG. 4 shows a complete shock absorber or oscillation damper 200. The air suspension spring 1 could, in accordance with at least one embodiment of the present invention, be installed at an upper end 299 of the shock absorber of FIG. 4. The shock absorber or oscillation damper 200 essentially includes a pressure pipe 202 in which a piston 203 on a piston rod 204 divides a working space 205 into a piston-rod-side, or upper working chamber 211, and a lower working chamber 206. A bottom valve unit 207 closes the pressure pipe 202 at the lower end thereof. A fluid path 208 is formed between the pressure pipe 202 and an intermediate pipe 209, the intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod 204 guiding and sealing unit 215. Both the upper working chamber 211 and the lower working chamber 206 are filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. As long as the valve unit 201 is closed, the bypass 210, 208, 201 (established by the connecting orifice 210, the fluid path 208, and the valve unit 201) is also closed. This is the hardest mode of operation of the oscillation damper 200. When, however, the valve unit 201 is more or less opened, the bypass 210, 208, 201 is also open. As a result thereof the following behavior exists: On upward movement of the piston rod 204, liquid can flow from the highly pressurized upper working chamber 211 not only across the piston 203 providing a high flow resistance, but also from the working chamber 211 through the bypass 210, 208, 201 to the compensating chamber 212. As such, the damping force is reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the Bypass 210, 208, 201 to the compensating chamber 212. As such, the damping force is again reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

Figure 5:
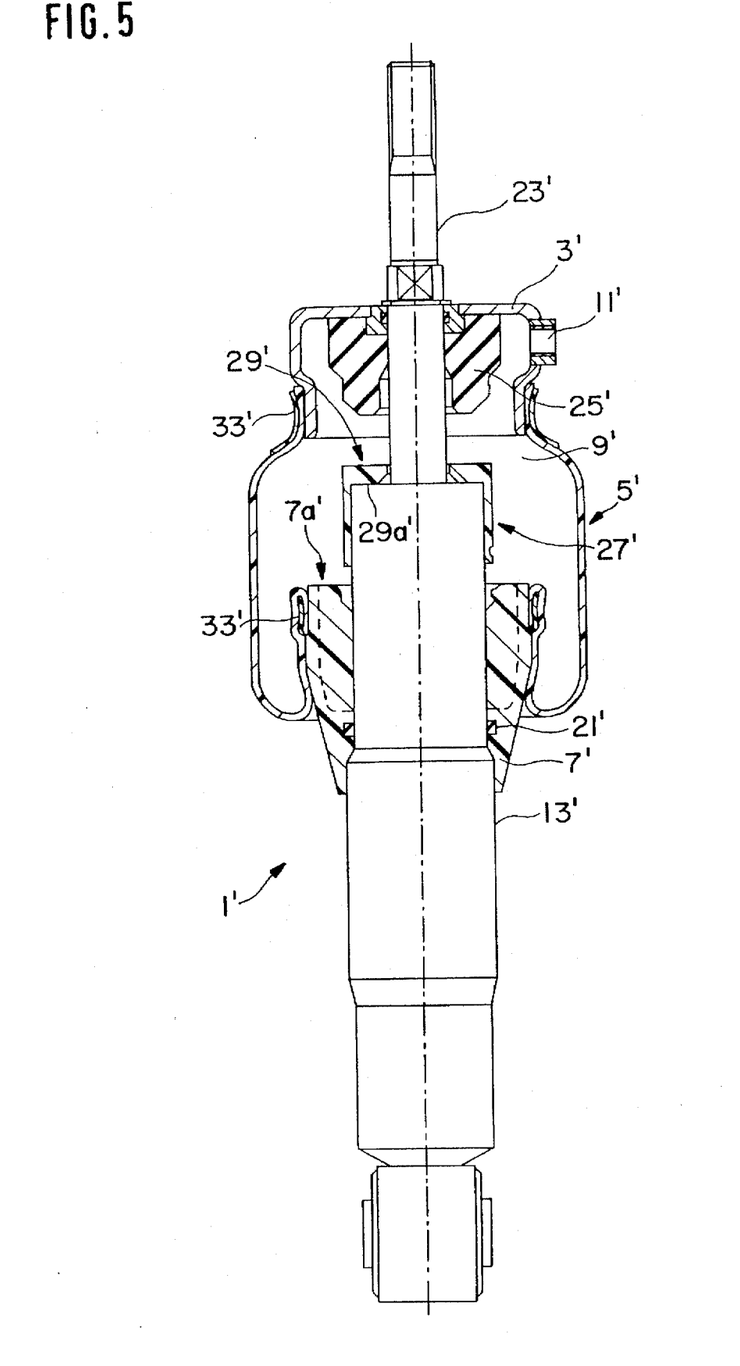
FIG. 5 shows a shock absorber with which the embodiments of the present invention could be incorporated.

FIGS. 5 shows another embodiment of the present invention in combination with a typical shock absorber, and is presented as an example of an entire assembly of a spring bellows and a shock absorber.

The assembly in FIG. 5 shows a pneumatic spring 1', composed of an outer tube 3' which together with a spring bellows 5' and a roller tube 7', forms a spring chamber 9'.

The roller tube 7' can be braced against a spring carrier 13', which in this embodiment is realized as a vibration damper. The spring carrier 13', which may be a receptacle tube or a sheath tube, of the vibration damper has a shoulder 15' against which the roller tube 7' is braced. At least one gasket 21' can be provided to seal the spring chamber 9' against the atmosphere at the receptacle tube. The outer tube 3' can be connected to a piston rod 23', which piston rod 23' can be connected to a secondary spring 25' in the form of an elastic buffer.

One feature of the invention resides broadly in the self-pumping air suspension spring for a motor vehicle, comprising roller bellows which form a spring chamber, a spring carrier which consists of a cylinder and a piston rod which can be displaced axially in the cylinder, whereby the roller bellows are functionally connected to the cylinder and the piston rod, a vestibule with at least one connection to the spring chamber and at least one connection to the compressed air reservoir, whereby when there is a movement of the piston rod, a pumping process into the spring chamber takes place via the vestibule in connection with at least one non-return valve, characterized by the fact that the vestibule 29 is located inside the spring chamber 6 which is enclosed by the roller bellows 3 and the cylinder 7, whereby at least one of the components of the air suspension spring which performs the pumping process is formed by the piston rod 9.

Another feature of the invention resides broadly in the air suspension spring characterized by the fact that the vestibule 29 is formed by a tube 31 which has a first bottom 33 which is functionally connected to the piston rod 9, and a second bottom 35 which is functionally connected to the cylinder 7, whereby inside the at least partly hollow piston rod there is a flow connection 23 with the air reservoir which emerges in the vestibule, whereby the vestibule is reduced in size when the piston rod executes an insertion movement, and the excess compressed air escapes into the spring chamber by means of a non-return valve 43.

Yet another feature of the invention resides broadly in the air suspension spring characterized by the fact that the second bottom is formed by an end surface of the cylinder 7 on the piston rod exit side.

Still another feature of the invention resides broadly in the air suspension spring characterized by the fact that the non-return valve between the vestibule and the spring chamber is an elastically expandable ring 41 which covers an overflow opening 3 in the tube 31.

A further feature of the invention resides broadly in the air suspension spring characterized by the fact that the vestibule 29 is located inside a hollow piston rod 9, whereby inside the hollow piston rod there is a piston 47 which is connected with the cylinder, and when there is a spring movement, the piston 47 executes a relative movement with respect to the piston rod and defines the volume of the vestibule.

Another feature of the invention resides broadly in the air suspension spring characterized by the fact that the vestibule 29 is formed by an extension of the flow connection 23 to the air reservoir, which can be of any type desired.

Yet another feature of the invention resides broadly in the air suspension spring characterized by the fact that the pumping process is performed by a partly-elastic membrane 53 which surrounds the piston rod 9, whereby the membrane is firmly clamped on one of its limiting edges 55 and on the other limiting edge 57 is in contact with the component to be sealed, and together with a wall 59 forms the vestibule, which functionally corresponds to the part which firmly clamps the limiting edge, whereby as a result of the movement of the part with which the limiting edge 55 of the membrane is in contact and the fixed position of the other limiting edge, increases or decreases the size of the vestibule by means of a shielding movement of the membrane, so that an overpressure or an underpressure is established alternately in the vestibule.

Still another feature of the invention resides broadly in the air suspension spring characterized by the fact that the membrane is enclosed above and below (on the top and on the bottom) by a wall 59, so that two vestibules 29 are formed.

A further feature of the invention resides broadly in the air suspension spring characterized by the fact that the plane of the wall 29 is realized at an angle to the idle (no-load) position of the membrane 53.

Another feature of the invention resides broadly in the air suspension spring characterized by the fact that the wall has a shoulder, the clearance of which, starting from the clamped position of the membrane, is less than the width of the membrane itself, so that there is a clearance zone 61 for the moving limiting edge.

Yet another feature of the invention resides broadly in the air suspension spring characterized by the fact on the moving limiting edge 59 of the membrane, there is a curved end surface 63, which rolls along the moving component during the shielding movement of the membrane.

Still another feature of the invention resides broadly in the air suspension spring characterized by the fact that the curved end surface has a radius which equals the width of the membrane between the clamped and the moving limiting edges in the vicinity of the no-load position.

A further feature of the invention resides broadly in the air suspension spring characterized by the fact that the vestibule 29 is located inside a roller tube which is pushed onto the cylinder.

It is to be understood that the terms "roll bellows", "roller bellows", and "rolling bellows", as employed herein, may be considered to be interchangeable with one another.

Examples of air shocks and air suspension springs in which embodiments of the present invention could possibly be incorporated may be found in the following documents: U.S. patent application Ser. No. 08/197692, filed on Feb. 17, 1994, entitled "Shock Absorber with Air Shock Module, Air Shock Module for a Shock Absorber and Process for Installation of the Air Shock Module and Shock Absorber", having inventors Gilsdorf et al., which corresponds to Federal Republic of Germany patent application No. P 43 04 961.3, filed on Feb. 18, 1993, which corresponds to DE-OS 43 04 961.3 and DE-PS 43 04 961.3; U.S. patent application Ser. No. 08/430558, filed on Apr. 28, 1995, entitled "Shock Absorber and Pneumatic Spring Assembly", having inventor Gubitz, which corresponds to Federal Republic of Germany patent application No. P 44 15 045.8, filed on Apr. 29, 1994, which corresponds to DE-OS 44 15 045.8 and DE-PS 44 15 045.8; U.S. patent application Ser. No. 08/393469, filed on Feb. 27, 1995, entitled "Motor Vehicle Strut, Such as a MacPherson Strut, with Internal Level Control", having inventor Kuchheuser, which corresponds to Federal Republic of Germany patent application No. P 44 06 348.2-21, filed on Feb. 26, 1994, which corresponds to DE-OS 44 06 348.2-21 and DE-PS 44 06 348.2-21; U.S. patent application Ser. No. 08/509105, filed on Aug. 1, 1995, entitled "Air Suspension System of a Motor Vehicle with Air Shocks or Air Spring with a Compressed Air Container in the Air Suspension System", having inventor Pradel, which corresponds to Federal Republic of Germany patent application No. P 195 08 854.9, filed on Mar. 11, 1995, which corresponds to DE-OS 195 08 854.9 and DE-PS 195 08 854.9; U.S. patent application Ser. No. 08/331350, filed on Oct. 28, 1994, entitled "Shock Absorber and Pneumatic Spring Assembly", having inventors Handke and Wengenroth, which corresponds to Federal Republic of Germany patent application No. P 44 26 243.4, filed on Jul. 23, 1994, which corresponds to DE-OS 44 26 243.4 and DE-PS 44 26 243.4; U.S. patent application Ser. No. 08/331043, filed on Oct. 28, 1994, entitled "Pneumatic Spring-vibration Damper Assembly", having inventor Gubitz, which corresponds to Federal Republic of Germany patent application No. P 44 29 992.3, filed on Aug. 24, 1994, which corresponds to DE-OS 44 29 992.3 and DE-PS 44 29 992.3; U.S. patent application Ser. No. 08/380029, filed on Jan. 30, 1995, entitled "Shock Absorber Assembly for a Motor Vehicle, the Shock Absorber Assembly Having a Pneumatic Spring", having inventors Gubitz and Gilsdorf, which corresponds to Federal Republic of Germany patent application No. P 44 07 263.5, filed on Mar. 4, 1994, which corresponds to DE-OS 44 07 263.5 and DE-PS 44 07 263.5; and U.S. patent application Ser. No. 08/407586, filed on Mar. 20, 1995, entitled "Vibration Damper and Pneumatic Suspension System", having inventors Gilsdorf et al., which corresponds to Federal Republic of Germany patent application No. P 44 09 252.0, filed on Mar. 18, 1994, which corresponds to DE-OS 44 09 252.0 and DE-PS 44 09 252.0. These patents and patent applications and their corresponding published patent applications, as well as their published equivalents, and other equivalents or corresponding applications, if any, are hereby incorporated by reference as if set forth in their entirety herein. All of the above U.S. patent documents in this paragraph are assigned to Fichtel & Sachs AG of the Federal Republic of Germany.

Examples of shock absorbing devices, possibly employing a "self-pumping" feature, components thereof, and components associated therewith, which may be utilized in accordance with at least one embodiment of the present invention, may be found in the following U.S. Pat. No. 4,577,840, which issued to Meller et al. on Mar. 25, 1986, entitled "Self-pumping Hydropneumatic Spring Leg or Strut with Internal Level Control for Motor Vehicles"; No. 4,828,234, which issued to Hoying and Smith on May 9, 1989, entitled "Hydraulic Engine Mount with Self-pumping Air Bladder; No. 5,062,616, which issued to Sommer on Nov. 5, 1991, entitled "Self-pumping Hydropneumatic Shock Absorbing Strut"; and No. 4,993,693, which issued to Lohr et al. on Feb. 19, 1991, entitled "Self-pumping Hydropneumatic Shock Absorbing Leg with Internal Level Regulation".

Examples of non-return valves, components thereof, and components associated therewith, which may be utilized in conjunction with the present invention can possibly be found in the following U.S. Pat. No. 4,747,426, which issued to Weevers on May 31, 1988, entitled "Check Valve"; U.S. Pat. No. 5,094,261, which issued to Giacomini on Mar. 10, 1991, entitled "Non-return Valve"; U.S. Pat. No. 5,080,122, which issued to Neuzeret on Jan. 14, 1992, entitled "Non-return Valve"; U.S. Pat. No. 4,300,593, which issued to Ritter on Nov. 17, 1981, entitled "Back Pressure Regulator and Non-return Valve"; U.S. Pat. No. 4,296,772, which issued to Nilsson on Oct. 27, 1981, entitled "Non-return Valve"; and U.S. Pat. No. 4,191,211, which issued to Walker on Mar. 4, 1980, entitled "Valve Member for a Non-return Valve".

Examples of bellows, components thereof, and components associated therewith, which may be utilized in conjunction with the present invention can possibly be found in the following U.S. Pat. No. 5,176,404, which issued to Sulzyc on Jan. 5, 1993, entitled "Level Control Valve for Automatically Keeping Constant the Vehicle Height of a Commercial Vehicle"; U.S. Pat. No. 5,180,185, which issued to Eckert on Jan. 19, 1993, entitled "Device for Obtaining an Axle-load Signal of a Mechanically Spring-supported Drive Axle of a Lifting Axle Structure"; U.S. Pat. No. 4,974,820, which issued to Nakanishi on Dec. 4, 1990, entitled "Bellows Type Shock Absorber"; U.S. Pat. No. 4,634,099, which issued to Danko et al. on Jan. 6, 1987, entitled High Pressure Inverted Bellows Valve"; U.S. Pat. No. 4,718,649, which issued to Pohlmann et al. on Jan. 12, 1988, entitled "Rolling Bellows for Pneumatic Cushioning of a Vehicle"; and U.S. Pat. No. 5,180,146, which issued to Schneider and Gawinski on Jan. 19, 1993, entitled "Rolling Piston for a Roll Bellows of a Roll Bellows-type Pneumatic Shock Absorber".

Examples of materials which can possibly be used for the walls of bellows, and which may be utilized in conjunction with the present invention can possibly be found in the following U.S. Pat. No. 5,196,258, which issued to Keller et al. on Mar. 23, 1993, entitled Wall for an Air-spring Bellows"; U.S. Pat. No. 4,521,582, which issued to Goyert and Winkler on Jun. 4, 1985, entitled "Thermoplastic Polyurethanes Having a High Heat Stability, Based on Napthylene Diisocyanate, Their Production and Their Use"; U.S. Pat. No. 5,346,187, which issued to Drescher on Sep. 13, 1994, entitled "Roll Bellows-type Pneumatic Shock Absorber Having A Reinforced Roll Bellows"; and U.S. Pat. No. 5,201,499, which issued to Elliott et al. on Apr. 13, 1993, entitled "Fabric Reinforced Stiffener for Air Springs".

Examples of shock absorbers, which may be utilized in accordance with the embodiments of the present invention, may be found in the following U.S. Pat. No. 4,838,393, entitled "Hydro-mechanical Stop Having a Restrictive Passage", which issued to Mourray et al. on Jun. 13, 1989; U.S. Pat. No. 4,817,928, entitled "Suspension System", which issued to Patton on Apr. 4, 1989; U.S. Pat. No. 4,527,674, entitled "Shock Absorber with a Hydro-mechanical Stop", which issued to Mourray on Jul. 9, 1985; U.S. Pat. No. 4,962,916, entitled "Compression Spring", which issued to Palinkas on Oct. 16, 1990; and U.S. Pat. No. 4,756,516, entitled "Resiliently Deformable Element Usable as an End Stop in a Motor Vehicle Suspension", which issued to Tondato on Jul. 12, 1988.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 05 026.6, filed on Feb. 15, 1995, having inventors Henning Rittstieg and Hartmut Röeke, and DE-OS 195 05 026.6 and DE-PS 195 05 026.6, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Self-pumping air suspension spring for a motor vehicle, comprising roller bellows which form a spring chamber, a spring carrier which comprises a cylinder and a piston rod which can be displaced axially in the cylinder, whereby the roller bellows are functionally connected to the cylinder and the piston rod, a compressed air reservoir, a vestibule with at least one connection to the spring chamber and at least one connection to the compressed air reservoir, whereby when there is a movement of the piston rod a pumping process into the spring chamber takes place via the vestibule in connection with at least one non-return valve, characterized by the fact that the vestibule is located inside the spring chamber which is enclosed by the roller bellows and the cylinder, whereby at least one of the components of the air suspension spring which performs the pumping process is formed by the piston rod, the vestibule is formed by a tube which has a first bottom which is functionally connected to the piston rod, and a second bottom which is functionally connected to the cylinder, whereby inside the at least partly hollow piston rod there is a flow connection with the air reservoir which emerges in the vestibule, whereby the vestibule is reduced in size when the piston rod executes an insertion movement, and the excess compressed air escapes into the spring chamber by means of a non-return valve, the non-return valve between the vestibule and the spring chamber is an elastically expandable ring which covers an overflow opening in the tube.

2. Self-pumping air suspension spring for a motor vehicle, comprising roller bellows which form a spring chamber, a portion of the roller bellows comprising a wall, a spring carrier which comprises a cylinder and a piston rod which can be displaced axially in the cylinder, whereby the roller bellows are functionally connected to the cylinder and the piston rod, a compressed air reservoir, a vestibule with at least one connection to the spring chamber and at least one connection to the compressed air reservoir, whereby when there is a movement of the piston rod a pumping process into the spring chamber takes place via the vestibule in connection with at least one non-return valve, characterized by the fact that the vestibule is located inside the spring chamber which is enclosed by the roller bellows and the cylinder, whereby at least one of the components of the air suspension spring which performs the pumping process is formed by the piston rod, the pumping process is performed by a partly-elastic membrane which surrounds the piston rod, whereby the membrane is firmly clamped on one of its limiting edges and on the other limiting edge is in contact with a second portion of the roller bellows, and together with the wall forms the vestibule, which functionally corresponds to the part which firmly clamps the limiting edge, whereby as a result of the movement of the part with which the limiting edge of the membrane is in contact and the fixed position of the other limiting edge, increases or decreases the size of the vestibule by means of a shielding movement of the membrane, so that an overpressure or an underpressure is established alternately in the vestibule.

3. The self-pumping air suspension spring according to claim 2, characterized by the fact that the membrane is enclosed above and below by the wall, so that two vestibules are formed.

4. The self-pumping air suspension spring according to claim 2, characterized by the fact that the plane of the wall is realized at an angle to the idle position of the membrane.

5. The self-pumping air suspension spring according to claim 2, characterized by the fact that the wall has a shoulder, the clearance of which, starting from the clamped position of the membrane, is less than the width of the membrane itself, so that there is a clearance zone for the moving limiting edge.

6. The self-pumping air suspension spring according to claim 2, characterized by the fact on the moving limiting edge of the membrane, there is a curved end surface, which rolls along the moving component during the shielding movement of the membrane.

7. The self-pumping air suspension spring according to claim 6, characterized by the fact that the curved end surface has a radius which equals the width of the membrane between the clamped and the moving limiting edges, when no load is applied to the air spring.

8. The self-pumping air suspension spring according to claim 2, characterized by the fact that the vestibule is located inside a roller tube which is pushed onto the cylinder.

9. A self-pumping air suspension spring for a motor vehicle, said air-suspension spring comprising:

a spring carrier;

said spring carrier comprising:
- a cylinder, said cylinder having a longitudinal axis;
- a piston rod which can be displaced axially within said cylinder; and
- said piston rod comprising a hollow portion;

an air bellows;

said air bellows being disposed to form a spring chamber;

said spring chamber being enclosed by said air bellows and said cylinder;

said air bellows being operatively connected to said cylinder and said piston rod to provide self-pumping of said air suspension spring;

a tube disposed within said spring chamber;

a second chamber disposed within said tube;

said tube having a first end and a second end;

said tube being disposed to receive compressed air;

said first end of said tube being fixedly connected to said piston rod;

at least one flow connection from said second chamber to said spring chamber;

means for providing compressed air;

at least one connection to said means for supplying compressed air;

at least one non-return valve; and said at least one non-return valve being disposed between said second chamber and said spring chamber to permit flow of compressed air from said second chamber into said spring chamber upon a decrease in size of said second chamber during operation of said air suspension spring.

10. The self-pumping air suspension spring according to claim 9 wherein said at least one non-return valve comprises:
- at least one flow passage between said second chamber and said spring chamber;
- an elastically expandable ring; and
- said elastically expanbable ring being disposed about said tube to cover said at least one flow passage to allow flow of air only from said second chamber to said spring chamber.

11. The self-pumping air suspension spring according to claim 10 wherein:
- said cylinder has a first end and a second end;
- said first end of said cylinder being disposed adjacent said tube; and
- said first end of said cylinder being disposed to form said second end of said tube to define said second chamber.

12. The self-pumping air suspension spring according to claim 10 wherein:
- said second chamber is disposed within said hollow portion of said piston rod;
- said air suspension spring comprises a piston; and
- said piston is disposed within said hollow portion of said piston rod to define said second chamber.

13. The self-pumping air suspension spring according to claim 12 wherein:
- said at least one connection comprises said hollow portion of said piston rod; and
- said second chamber is disposed in said at least one connection.

14. The self-pumping air suspension spring according to claim 11 wherein:
- said air-suspension spring comprises a partly-elastic membrane, said partly elastic membrane having an inner edge and an outer edge;
- said partly-elastic membrane is disposed about said piston rod;
- said inner edge of said partly-elastic membrane is slidingly disposed against said piston rod;
- said air bellows comprises a first portion, said first portion being disposed adjacent said cylinder;
- said air bellows comprises a second portion, said second portion being disposed adjacent said first portion and a distance from said piston rod; and
- said outer edge of said partly elastic membrane is fixedly connected to said second portion of said air bellows to define said second chamber.

15. The self-pumping air suspension spring according to claim 14 wherein said partly-elastic membrane is disposed at an acute angle with respect to said first portion of said air bellows.

16. The self-pumping air suspension spring according to claim 15 wherein:
- said first portion of said air bellows comprises a recessed region;
- said recessed region being disposed adjacent said piston rod; and
- said recessed region being disposed to provide clearance for said inner edge of said partly-elastic membrane.

17. The self-pumping air suspension spring according to claim 16 wherein:
- said inner edge of said partly-elastic membrane comprises a curved surface; and
- said curved surface is disposed against said piston rod to slide along said piston rod upon movement of said piston rod.

18. The self-pumping air suspension spring according to claim 17 wherein:
- said partly-elastic membrane has a rest position when said air suspension spring is not under load;
- said partly elastic membrane has a width in said rest position;
- said curved surface has a radius; and
- said radius of said curved surface is equal to the width of said partly-elastic membrane in said rest position.

19. The self-pumping air suspension spring according to claim 18 wherein:
- said air bellows comprises a third portion; and
- said third portion of said air bellows being disposed adjacent said piston rod to divide said second chamber into a third chamber and a fourth chamber.

20. The self-pumping air suspension spring according to claim 19 wherein:
- said air bellows comprises a roller tube, said roller tube being disposed about said cylinder; and
- said second chamber is disposed within said roller tube.

* * * * *

UNITED STATES PATENT AND TRADEMARK OFFICE
CERTIFICATE OF CORRECTION

PATENT NO. : 5,669,597
DATED : September 23, 1997
INVENTOR(S) : Henning RITTSTIEG and Hartmut RÖLLEKE It is certified that error appears in the above-identified patent and that said Letters Patent is hereby corrected as shown below:

On the title page, item [75], after 'Rölleke, delete "Obereisser," and insert --Kircheip,--.

In column 11, line 48, after 'Hartmut', delete "Röeke," and insert --Rölleke,--.

Signed and Sealed this

Twenty-seventh Day of January, 1998

Attest:

BRUCE LEHMAN

*Attesting Officer*   *Commissioner of Patents and Trademarks*